Aug. 24, 1965
G. C. GRUBB ETAL
3,201,920
ACETYLENE PURIFICATION
Filed March 17, 1961
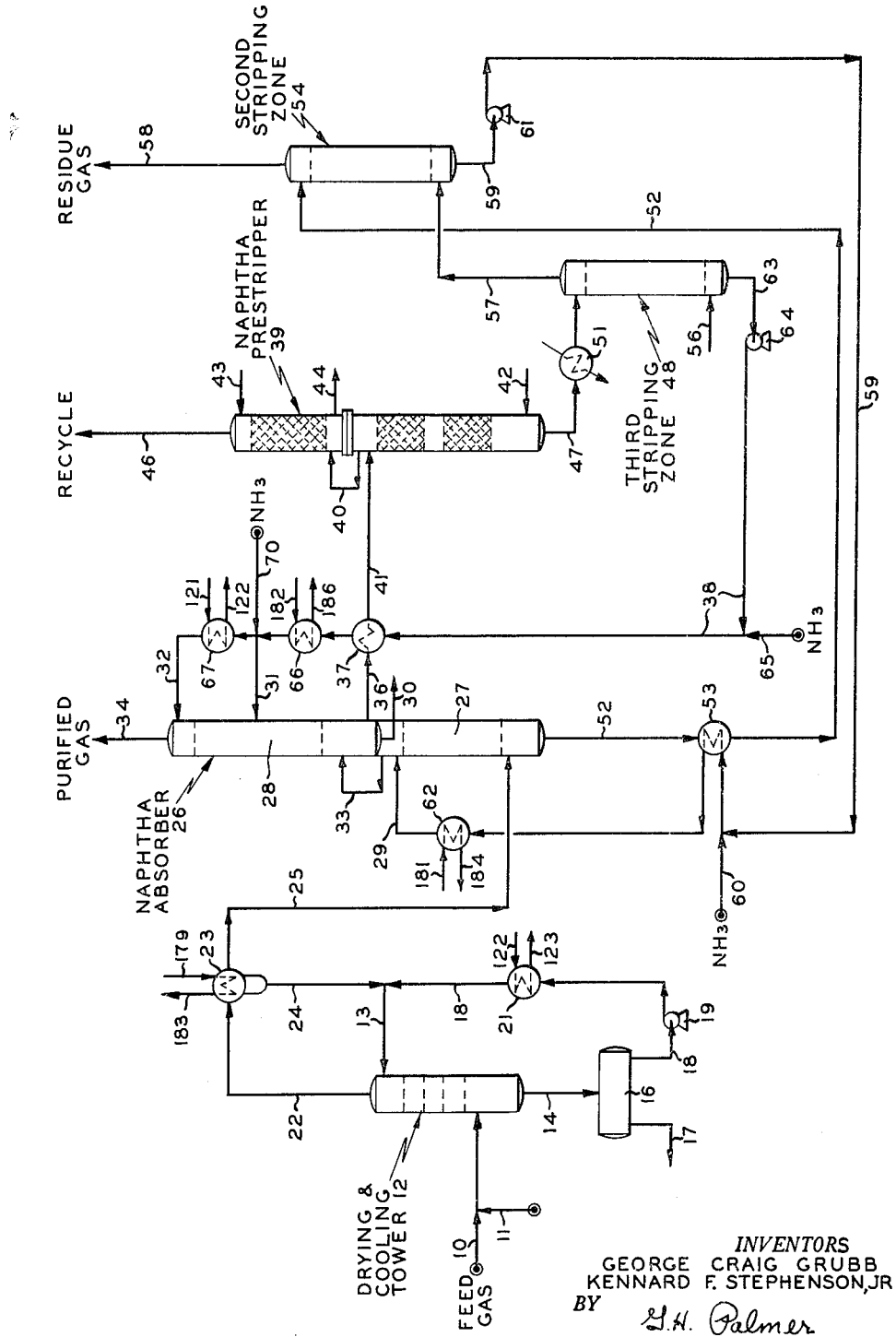
INVENTORS
GEORGE CRAIG GRUBB
KENNARD F. STEPHENSON, JR
BY
G.H. Palmer
John C. Quinlan
ATTORNEYS

United States Patent Office 3,201,920
Patented Aug. 24, 1965

3,201,920
ACETYLENE PURIFICATION
George Craig Grubb, Eatontown, N.J., and Kennard F. Stephenson, Jr., Croton-on-Hudson, N.Y., assignors to Pullman Incorporated, a corporation of Delaware
Filed Mar. 17, 1961, Ser. No. 96,602
4 Claims. (Cl. 55—48)

The present invention relates to a process for the production of acetylene by pyrolysis of a hydrocarbon feed. In one of its aspects this invention relates to the separation of acetylene from the gaseous pyrolysis products.

A principal commercial process for the preparation of acetylene involves the pyrolysis of low boiling hydrocarbon feedstocks, i.e., light hydrocarbons ranging from normally gaseous hydrocarbons through light naphthas. In the pyrolysis process the hydrocarbon feed is maintained under closely controlled conditions of temperature, pressure and reaction time to provide a gas mixture containing a recoverable quantity of acetylene. As indicated, the process is applicable to the conversion of normally gaseous hydrocarbons as well as normally liquid hydrocarbons. In the conversion of normally gaseous hydrocarbons, the feed material is preheated and combined with a quantity of oxygen in an amount sufficient to oxidize a portion of the hydrocarbon feed. This oxidation reaction supplies the bulk of the heat necessary for the conversion of hydrocarbons to desired products. For the conversion of normally liquid hydrocarbons to acetylene, a suitable combustion gas, such as hydrogen or mixtures of hydrogen with carbon oxides, and hydrocarbon is burned with oxygen under conditions conducive to complete oxidation of the combustion gas. The liquid hydrocarbon feed, preferably preheated, is injected into the hot combustion gases. Preheating of the hydrocarbon feed should be kept substantially below reaction temperature in order to avoid premature reactions.

The pyrolytic conversion of hydrocarbons is an endothermic reaction and the distribution of the pyrolysis reaction products is determined to a significant extent by the reaction temperature and the reaction time in addition to the feed composition. Pressure also influences product distribution. As a general rule, high temperatures combined with short reaction times favor the production of acetylene whereas lower temperatures and longer reaction times favor the production of ethylene. Conditions most favorable to the production of acetylene include reaction temperatures between about 1500° C. and about 3000° C., with a reaction time between about 0.001 and about 0.01 second. Unfortunately, conditions most favorable for the production of acetylene also tend to favor the production of acetylene homologues such as methyl acetylene, vinyl acetylene, diacetylene, etc., various other $C_1$–$C_6$ hydrocarbons, hydrogen, carbon monoxide and carbon dioxide. The commercial use of acetylene as a chemical intermediate as, for example, in the preparation of chlorinated ethylenes, acetic acid, vinyl chloride, vinyl acetate, neoprene, chloroprene, and acrylonitrile, requires acetylene of extremely high purity, necessitating substantially complete removal of all of the foregoing materials from the pyrolysis effluent. Acetylene can be selectively absorbed from admixture with hydrogen, carbon monoxide and methane but prior to such selective absorption, it is necessary to effect a prepurification of the acetylene-containing gases to remove hydrocarbons higher boiling than acetylene including acetylene homologues. The prepurification process must be carefully selected to avoid the hazards of explosion and polymerization to which the unstable acetylene homologues are prone, particularly in the case of diacetylene which can only be handled in dilute concentrations.

In one process for removing acetylene homologues and other hydrocarbons heavier than acetylene, the acetylene-containing gas mixture is contacted with a heavy naphtha absorbent under conditions which favor the absorption of substantially all of the acetylene homologues together with a minor amount of acetylene. The rich absorbent is passed to a first stripping zone where it is contacted with a product gas to strip the absorbed acetylene. The absorbent free of absorbed acetylene but containing acetylene homologues is passed to a second stripping zone where it is contacted with a product gas to remove remaining absorbed hydrocarbons including acetylene homologues. The regenerated absorbent is recycled to the absorption zone.

In that naphtha absorption-stripping process, the rate at which the naphtha is circulated is principally influenced by the concentration of the $C_3$ hydrocarbon impurities (methyl acetylene and propadiene) rather than that of the $C_4$ and heavier hydrocarbon impurities in the acetylene-containing gas because the solubility of these hydrocarbon impurities in the non-selective naphtha absorbent increases with rising molecular weight. Thus, a naphtha circulation rate adequate to absorb substantially all of the $C_3$ hydrocarbon impurities is more than adequate to absorb substantially all of the $C_4$ and heavier hydrocarbon impurities and, in fact, results in a rich naphtha stream which is appreciably below its saturated condition relative to the heaviest hydrocarbon impurity ($C_6$ or $C_7$) originally present in the acetylene-containing gas. Since the same solubility relationships apply to the stripping operation, the rate at which stripping gases are introduced into the second stripping zone is principally influenced by the concentration in the rich absorbent of the heaviest hydrocarbon impurity originally present in the acetylene-containing gas. Thus, the required stripping gas rate is appreciably greater than that required to desorb all of the absorbed lighter hydrocarbon impurities ($C_3$ and $C_4$) and, moreover, appreciably greater than that required to desorb the heaviest hydrocarbon impurity from its saturated solution in naphtha. The additional stripping gas required to offset the low concentration of the heaviest hydrocarbon impurity absorbed in the naphtha is not only an additional expense to the operation but also causes significant amounts of the naphtha absorbent to be vaporized and lost from the circulating system.

It is, therefore, a principal object of the present invention to provide an improved process for separating acetylene homologues and other hydrocarbons heavier than acetylene from an acetylene-containing pyrolysis gas.

It is another object of the invention to provide an improved process for the preparation of acetylene.

Still another object of this invenion is to provide a process which prevents the polymerization of acetylene homologues.

A further object of the invention is to provide an improved method for removing acetylene homologues and hydrocarbons heavier than acetylene from a gas mixture containing the same, acetylene, hydrogen and carbon oxides.

Various other objects and advantages of the invention will become apparent from the following detailed description and discussion.

According to the process of this invention, the above objects are accomplished by contacting the acetylene-containing gas mixture first with a relatively small heavy naphtha stream in a first absorption zone maintained under conditions which favor the absorption of the heaviest hydrocarbon impurity and then with a relatively large heavy naphtha stream in a second absorption zone maintained under conditions which favor the absorption of substantially all of the remaining acetylene homologues and other hydrocarbons heavier than acetylene together with a minor proportion of acetylene and ethylene. The relatively large rich naphtha stream from the second absorption zone is passed to a first stripping zone where it is contacted with a product gas to strip absorbed acetylene and ethylene. The relatively small rich naphtha stream from the first absorption zone is passed to a second stripping zone where it is contacted with a product gas to remove absorbed hydrocarbon impurities. The relatively large rich naphtha stream substantially free of acetylene and ethylene but containing absorbed acetylene homologues and other hydrocarbons heavier than acetylene is passed from the first stripping zone to a third stripping zone where it is contacted with a product gas to remove remaining absorbed hydrocarbon impurities including acetylene homologues. The regenerated naphtha streams from the second and third stripping zones are recycled to the first and second absorption zones, respectively.

In carrying out the process of this invention the crude acetylene-containing gas produced by the pyrolysis of a hydrocarbon feedstock is first treated to remove carbon, tar and carbon dioxide which are formed during the reaction. After this preliminary treatment the acetylene-containing gas is cooled by contact in a cooling zone with a solvent having a suitably low freezing point such as heavy naphtha, acetone, methanol, ethanol, etc. A preferred solvent is heavy naphtha because it is also used as the solvent for the subsequent removal of hydrocarbons heavier than acetylene and use of the same solvent for both purposes eliminates the need for separate solvent recovery systems. Water which is formed during the reaction and is picked up in the preliminary purification steps is condensed by the cooling and is separated. After contact with the solvent, the gas which is completely saturated with the solvent is further cooled, solvent and water which condense are separated, and the gas is passed to the first absorption zone.

In each of the naphtha absorption zones the acetylene-containing gas is contacted with a heavy naphtha having a boiling range between about 300° F. and about 500° F. The boiling range of the naphtha is an important factor since too low boiling a fraction would result in excessive volatilization and loss of the absorbent during subsequent stripping operations while too high boiling a fraction would complicate the separation of acetylene homologues from the absorbent. As indicated, in the first naphtha absorption zone the acetylene-containing gas is contacted countercurrently with a relatively small naphtha stream under conditions which favor the absorption of the heaviest, most readily soluble hydrocarbon impurities in the feed gas. Thus, if the heaviest hydrocarbon impurities in the feed gas are $C_6$ hydrocarbons, conditions are controlled to absorb substantially all of these $C_6$ hydrocarbon impurities. Of course, some $C_5$ and lighter hydrocarbon impurities will also be absorbed. Suitable conditions in the first absorption zone include a temperature between about −30° F. and about 10° F., preferably between about −15° F. and about 0° F., a pressure between about 40 p.s.i.a. and about 275 p.s.i.a. and average $L/V$ ratio (mols of liquid naphtha per mole of gas) between about 0.01 and about 0.06, preferably about 0.045 to about 0.050.

The resultant gas mixture from the first absorption zone is then countercurrently contacted with a relatively large heavy naphtha stream in a second absorption zone maintained under conditions which favor the absorption of substantially all of the $C_3$ hydrocarbon impurities, i.e., methyl acetylene and propadiene. Under these conditions, substantially all of the remaining $C_4$ and heavier hydrocarbons will also be absorbed. Suitable conditions in the second absorption zone include temperatures between about −50° F. and about 10° F., preferably about −15° F. to about 0° F., a pressure between about 40 p.s.i.a. and about 275 p.s.i.a. and an average $L/V$ ratio between about 0.09 and about 0.65, preferably about 0.36 to about 0.50. Low temperatures are preferably maintained in each of the naphtha absorption zones because of the tendency of acetylene homologues to polymerize at high temperatures and because smaller amounts of circulating absorbent are required at lower temperatures, thereby permitting reduction in the size of equipment in the system. Maintenance of the above conditions in the second absorption zone results in the absorption of substantially all of the remaining methyl acetylene and heavier hydrocarbon impurities together with small amounts of acetylene and ethylene. Thus, the $L/V$ ratio in the second absorption zone is between about 8 and about 30 times as great as that in the first absorption zone.

Because of the relatively large quantity of naphtha circulating through the second absorption zone, some acetylene and ethylene are absorbed. In order to recover the absorbed acetylene and ethylene, the rich absorbent from the second absorption zone is passed to a first stripping zone or naphtha prestripper where it is contacted countercurrently with a stripping gas, preferably a product gas, to remove absorbed acetylene and ethylene. The term product gas, as used herein, means any of the pyrolysis gases such as hydrogen, methane, ethane, carbon monoxide, carbon dioxide and steam, singly or in admixture. Best results are obtained by employing a stripping gas consisting of components of lower molecular weight than the components being stripped. An inert gas such as nitrogen can be used as stripping gas in place of product gas, although there is no particular advantage in such substitution and in fact the use of inert gas is in many instances detrimental since a foreign component, which in some cases must be subsequently removed, is introduced into various off-gas streams. In order to increase the efficiency of the process, the stripped acetylene and ethylene is recycled and combined with feed gas. The naphtha prestripping zone is maintained at a temperature between about 50° F. and about 90° F. and a pressure between about 17 p.s.i.a. and about 30 p.s.i.a. The average $V/L$ ratio (mols of stripping gas per mol of liquid naphtha) is about 0.01 to about 0.10, preferably about 0.017 to about 0.025. Under these relatively mild stripping conditions substantially all of the absorbed acetylene and ethylene are stripped from the relatively large rich naphtha stream.

The relatively small rich naphtha stream is withdrawn as a bottoms fraction from the first absorption zone and is passed directly to a second stripping zone without prestripping since it contains substantially no acetylene or ethylene. In the second stripping zone the relatively small rich naphtha stream is countercurrently contacted with a product gas under conditions which favor the desorption of substantially all of the hydrocarbon impurities picked up in the first absorption zone. The second stripping zone is maintained at a temperature between about 40° F. and about 100° F., preferably about 50° F. to about 80° F., a pressure of about 35 p.s.i.a to about 50 p.s.i.a. and with an average $V/L$ ratio of about 6.7 to about 10.5, preferably about 7.7 to about 8.5. It should be noted that the concentration of the heavy hydrocarbon impurities in the relatively small rich naphtha stream is substantially higher, of the order of eight times greater, than would be the case if all of the hydrocarbon impurities in the acetylene-containing gas were removed in a single naphtha absorption stage. Consequently, the required amount of stripping gas to desorb the heavier hydrocarbon impurities from the concentrated solution is significantly less than from a dilute solution such as would result from single stage absorption. This reduction in stripping gas rate is reflected in a material reduction in losses of absorbent through vaporization.

The relatively large rich naphtha stream now free of acetylene but containing absorbed hydrocarbons heavier than acetylene including acetylene homologues is withdrawn as a bottoms fraction from the first stripping zone and is passed to a third stripping zone. In the third stripping zone it is countercurrently contacted with a product gas under conditions which favor the desorption of substantially all of the hydrocarbon impurities picked up in the second absorption zone. The third stripping zone is maintained at a temperature between about 60° F. and about 150° F., preferably about 95° F. to about 105° F., a pressure of about 35 p.s.i.a. to about 50 p.s.i.a. and with an average $V/L$ ratio of about 0.83 to about 1.2, preferably about 0.95 to about 1.05.

The regenerated naphtha streams from the second and third stripping zones are withdrawn as bottoms fractions and recycled after suitable cooling to the first and second absorption zones, respectively.

According to a preferred embodiment of the invention, part or all of the vaporous overhead fraction from the third stripping zone is employed to provide at least a portion of the stripping gas requirement of the second stripping zone. Such an arrangement makes efficient use of available stripping gas and is particularly advantageous where the second stripping zone is maintained at a lower temperature than that of the third stripping zone because at least some of the absorbent vaporized in the third stripping zone will be reabsorbed in the second stripping zone, thereby still further reducing losses of absorbent from the circulating system. While the above integration of steps is advantageous, the reverse stripping sequence should not be practiced because the vaporous overhead fraction from the second stripping zone contains the heaviest hydrocarbon impurities originally present in the acetylene-containing gas and the reverse sequence would lead to their reabsorption in the relatively large naphtha stream in the third stripping zone, defeating the purpose of the process.

For a specific example of a preferred embodiment of the invention, reference is had to the accompanying drawing which shows diagrammatically apparatus suitable for the removal of acetylene homologues and heavier hydrocarbons from an acetylene-containing gas. Referring to the drawing, about 4533.4 mols per hour of a gas stream containing acetylene obtained by the pyrolysis of natural gas and treated for the removal of carbon, tar and carbon dioxide is introduced through line 10 at a temperature of 95° F. and a pressure of 57 p.s.i.g. This gas has the composition given below in Table I.

Table I.—Feed gas composition, mols per hour

| | |
|---|---:|
| $H_2$ | 2589.9 |
| $N_2$ | 41.0 |
| $CO$ | 1171.2 |
| $CO_2$ | 0.4 |
| $CH_4$ | 222.4 |
| $C_2H_2$ | 381.4 |
| $C_2H_4$ | 21.6 |
| $C_3H_4$ [1] | 3.5 |
| $C_3H_4$ [2] | 1.9 |
| $C_3H_6$ | 0.5 |
| $C_4H_2$ | 9.4 |
| $C_4H_4$ | 4.3 |
| $C_4H_6$ | 0.5 |
| $C_6H_6$ | 3.6 |
| $H_2O$ | 60.0 |
| $NH_3$ | 21.8 |
| | 4533.4 |

[1] Methyl acetylene.
[2] Propadiene.

The gas stream in line 10 flows to the lower portion of a drying and cooling tower 12. In the process of this example, the gas is cooled by countercurrent contact with a cold heavy naphtha stream introduced through line 13 at a rate of about 110,161 pounds per hour. A bottoms liquid fraction containing naphtha and ammonia-water is withdrawn from tower 12 at 85° F. through line 14 and permitted to separate into hydrocarbon and ammonia-water phases in separation drum 16 from which the ammonia-water solution is continuously withdrawn at a rate of about 129 gallons per hour through line 17. The hydrocarbon phase is recirculated to tower 12 in lines 18 and 13 by pump 19 after cooling to 28° F. by indirect heat exchange in heat exchanger 21. A cold tail gas at —30° F. is introduced into exchanger 21 through line 122 and withdrawn through line 123 at 70° F. to provide the cooling duty of the exchanger. The pyrolysis gas saturated with naphtha is withdrawn from tower 12 through line 22 at a temperature of 31° F. and a pressure of 55 p.s.i.g. The naphtha-saturated gas stream flowing in line 22 passes through heat exchanger 23 where its temperature is lowered to —10° F. As a result of this cooling, about 161 pounds per hour of naphtha and ammonia-water are condensed in exchanger 23 and returned to tower 12 through line 24. The cooling duty of exchanger 23 is provided by vaporizing liquid ammonia at —23° F. and 2 p.s.i.g. The ammonia refrigerant is introduced to exchanger 23 through line 179 and is withdrawn through line 183.

Ice formation in tower 12 and exchanger 23 is prevented by the presence of ammonia which dissolves in tne water condensed as a result of cooling. The ammonia content of the feed gas in line 10 is ordinarily adequate not only to prevent freezing in tower 12 and exchanger 23 but to supply part of the ammonia antifreeze requirement in the subsequent process steps. However, the ammonia content of the feed gas in line 10 is subject to some fluctuation creating from time to time conditions under which ice can form. Provision is therefore made to introduce an ammonia-rich stream through line 11 into the feed gas in line 10 so that the ammonia content of the gas entering tower 12 is always maintained at adequate levels an interruption of the process due to icing is precluded.

The chilled acetylene-containing gas from exchanger 23 passes in line 25 to a naphtha absorption column 26 which is operated at a bottom temperature of —2° F. and and a pressure of 53 p.s.i.g. and a top temperature of —36° F. and a pressure of 48 p.s.i.g. Absorption column 26 is provided with a lower absortion zone 27 and an upper absorption zone 28 which are interconnected only for the upward passage of gas by line 33. Approximately 30,217 pounds per hour of heavy naphtha are introduced into the top of the lower absorption zone 27 (average $L/V$ =0.047) through line 29 as discussed more fully below. Approximately 239,432 pounds per hour of heavy naphtha are introduced into the top of upper absorption zone 28 (average $L/V$=0.38) through lines 31 and 32, also as discussed more fully below. The cooled and dried acetylene-containing gas introduced into the bottom of naphtha absorption column 26 through line 25 passes countercurrently with the relatively small naphtha stream in the lower absorption zone 27, thence through line 33 at a temperature of about —10° F. and a pressure of about 52 p.s.i.g. to the upper absorption zone 28 and then countercurrently with the relatively large naphtha stream in the upper absorption zone 28, from which approximately 4423.2 mols per hour of acetylene-containing gas substantially free of acetylene homologues are withdrawn as an overhead fraction in line 34. The compositions of the partly purified gas in line 33 and the purified gas in line 34 are given below in Table II.

Table II.—Naphtha absorber gas compositions, mols per hour

|  | Line 33 | Line 34 |
|---|---|---|
| $H_2$ | 2,590.1 | 2,588.2 |
| $N_2$ | 41.0 | 41.0 |
| CO | 1,171.3 | 1,171.3 |
| $CO_2$ | 0.4 | 0.4 |
| $CH_4$ | 222.5 | 221.6 |
| $C_2H_2$ | 379.7 | 364.6 |
| $C_2H_4$ | 21.6 | 20.5 |
| $C_3H_4$ [1] | 3.3 | 1.1 |
| $C_3H_4$ [2] | 1.8 | 0.3 |
| $C_3H_6$ | 0.5 | 0.2 |
| $C_4H_2$ | 7.2 | 0.1 |
| $C_4H_4$ | 3.5 | nil |
| $C_4H_6$ | 0.3 | nil |
| $C_6H_6$ | 0.4 | nil |
| $H_2O$ | 0.7 | 0.2 |
| $NH_3$ | 20.8 | 13.7 |
|  | 4,465.1 | 4,423.2 |

[1] Methyl acetylene.
[2] Propadiene.

The first and second naphtha absorption zones have been shown in this example as incorporated in a single absorption tower, but it should be understood that they can be arranged in separate towers. The stacked arrangement shown is preferably used because of savings in vessel and piping costs.

Approximately 240,730 pounds per hour of rich naphtha absorbent containing absorbed acetylene homologues and some acetylene and ethylene are withdrawn from the bottom of upper absorption zone 28 through line 36 at a temperature of −7° F. This bottoms stream is heated to 70° F. in exchanger 37 by indirect heat exchange with recirculating lean naphtha flowing in line 38. The heated rich naphtha stream is passed from exchanger 37 in the lower section of a naphtha prestripping column 39 through line 41. The upper and lower sections of prestripper 39 are interconnected only for the upward passage of gas through line 40. The lower section of prestripper 39 operates at a bottom temperature of 69° F. and a pressure of 8 p.s.i.g. and a top temperature of 70° F. and a pressure of 5 p.s.i.g. In prestripper 39, the rich naphtha absorbent is stripped in the lower section by countercurrent contact with about 38.0 mols per hour of product gas (average $V/L=0.021$) at 60° F. which is introduced into the bottom of prestripper 39 through line 42. The composition of the product gas used to provide stripping gases is given below in Table III.

Table III.—Composition of Stripping gas, mol per cent

| | |
|---|---|
| $H_2$ | 63.6 |
| $N_2$ | 1.0 |
| CO | 28.7 |
| $CO_2$ | nil |
| $CH_4$ | 5.4 |
| $C_2H_2$ | 0.1 |
| $C_2H_4$ | 0.5 |
| $C_3H_4$ [1] } | 0.1 |
| $C_3H_4$ [2] } | |
| $C_3H_6$ | nil |
| $C_4H_2$ | nil |
| $C_4H_6$ | nil |
| $C_6H_6$ | nil |
| $H_2O$ | 0.5 |
| $NH_3$ | 0.1 |
| | 100.0 |

[1] Methyl acetylene.
[2] Propadiene.

Water at 100° F. is introduced into the upper section of the prestripper through line 43 and withdrawn therefrom through line 44 at 103° F. so as to reabsorb small amounts of ammonia stripped together with the acetylene and ethylene from the rich naphtha stream in the lower section of the prestripper by product gases. Thus, the overhead recovered from prestripper 39 at a temperature of 100° F. in line 46 contains substantially only acetylene, ethylene and product gases which are recycled to the feed gas at a rate of about 61.4 mols per hour. The composition of this recycle stream is given below in Table IV.

TABLE IV.—Recycle prestripper overhead gas, mols per hour

| | |
|---|---|
| $H_2$ | 25.0 |
| $N_2$ | 0.5 |
| CO | 13.9 |
| $CH_4$ | 3.7 |
| $C_2H_2$ | 13.4 |
| $C_2H_4$ | 1.0 |
| $C_3H_4$ [1] | 0.3 |
| $C_3H_4$ [2] | 0.1 |
| $C_4H_2$ | 0.3 |
| $C_4H_4$ | 0.2 |
| $H_2O$ | 2.9 |
| $NH_3$ | 0.1 |
| | 61.4 |

[1] Methyl acetylene.
[2] Propadiene.

As a result of prestripping, losses of acetylene and ethylene from the process incident to absorption in upper absorption zone 28 of the naphtha absorber 26 are significantly reduced.

Approximately 30,698 pounds per hour of rich naphtha absorbent are withdrawn from the bottom of the lower absorption zone 27 of naphtha absorption column 26 in line 52 and are delivered to the top of a second stripping zone 54 after being heated to 52° F. by indirect heat exchange with recirculating lean naphtha in heat exchanger 53. The second stripping zone 54 is maintained at a bottom temperature of 76° F. and pressure of 23 p.s.i.g. and a top temperature of 70° F. and a pressure of 22 p.s.i.g.

Approximately 240,141 pounds per hour of naphtha absorbent containing absorbed acetylene homologues but substantially free of acetylene and ethylene are withdrawn from the bottom of naphtha prestripping column 39 through line 47 and are delivered to the top of a third stripping zone 48, after being heated to 100° F. by indirect heat exchange with hot water in heat exchanger 51. Approximately 1678.6 mols per hour of product gas of the same composition as that given in Table III at a temperature of 60° F. are introduced into the lower portion of third stripping zone 48 through line 56 to provide requisite stripping gases (average $V/L=1.0$). Third stripping zone 48 is maintained at a bottom temperature of about 94° F. and a pressure of 25 p.s.i.g. and a top temperature of about 100° F. and a pressure of 23 p.s.i.g. The overhead fraction from third stripping zone 48 containing the product gases and the stripped acetylene homologues is withdrawn in line 57 and has the composition given in Table V below.

Table V.—Third stripping zone overhead gas, mols per hour

| | |
|---|---|
| $H_2$ | 1069.0 |
| $N_2$ | 16.7 |
| CO | 479.6 |
| $CH_4$ | 90.1 |
| $C_2H_2$ | 3.9 |
| $C_2H_4$ | 8.5 |
| $C_3H_4$ [1] | 2.6 |
| $C_3H_4$ [2] | 1.4 |
| $C_3H_6$ | 0.3 |
| $C_4H_2$ | 6.8 |
| $C_4H_4$ | 3.3 |
| $C_4H_6$ | 0.3 |
| $C_6H_6$ | 0.4 |
| $C_8$ | 1.0 |
| $C_9$ | 2.0 |
| $C_{10}$ | 1.6 |
| $C_{11}$ | 0.2 |
| $H_2O$ | 8.3 |
| $NH_3$ | 3.3 |
| | 1699.3 |

[1] Methyl acetylene.
[2] Propadiene.

The overhead fraction from third stripping zone 57 is introduced into the lower portion of second stripping zone 54 to provide requisite stripping gases (average $V/L=8.1$). In second stripping zone 54 stripping zone 54 substantially all of the hydrocarbon impurities picked up by the absorbent in lower absorption zone 27 are desorbed and appear along with the stripping gases introduced in line 57 in the overhead fraction in line 58 from second stripping zone 54. The residue gas in line 58 is withdrawn at a rate of about 1705.7 mols per hour and has the composition given in Table VI below.

*Table VI.—Second stripping zone overhead gas, mols per hour*

| | |
|---|---:|
| $H_2$ | 1068.8 |
| $N_2$ | 16.7 |
| CO | 479.5 |
| $CH_4$ | 90.0 |
| $C_2H_2$ | 5.6 |
| $C_2H_4$ | 8.5 |
| $C_3H_4$ [1] | 2.8 |
| $C_3H_4$ [2] | 1.5 |
| $C_3H_6$ | 0.3 |
| $C_4H_2$ | 9.0 |
| $C_4H_4$ | 4.1 |
| $C_4H_6$ | 0.5 |
| $C_6H_6$ | 3.6 |
| $C_8$ | 0.4 |
| $C_9$ | 1.3 |
| $C_{10}$ | 0.5 |
| $H_2O$ | 8.3 |
| $NH_3$ | 4.3 |
| | 1705.7 |

[1] Methyl acetylene.
[2] Propadiene.

It should be understood that fresh product gases can be used in whole or in part to provide stripping gases in second striping zone 54 just as are used in third stripping zone 48. Conditions in this example are such that the entire overhead fraction of the third stripping zone 48 is just sufficient to provide the stripping gas requirement of the second stripping zone 54. Because of the relatively small liquid rate in the second stripping zone and despite the fact that it is somewhat cooler than the third stripping zone, there is no appreciable reabsorption of the hydrocarbon impurities desorbed in the third stripping zone but there is some beneficial reabsorption of vaporized absorbent.

A regenerated naphtha stream is recovered as the bottoms fraction of the second stripping zone in line 59 and is recirculated at a rate of about 30,217 pounds per hour to the upper portion of lower absorption zone 27 in naphtha absorption column 26 through lines 59 and 29 by pump 61 after being cooled in exchanger 53 to 22° F. by rich naphtha flowing in line 52 and after being further cooled in exchanger 62 to —10° F. The refrigeration requirements of exchanger 62 are supplied by evaporating liquid ammonia at 2 p.s.i.g. and —23° F. The liquid ammonia is introduced into exchanger 62 through line 181 and the vaporized ammonia is withdrawn through line 184.

Regenerated naphtha is also recovered as the bottoms fraction of the third stripping zone 48 in line 63. This lean naphtha stream together with a small amount of make-up naphtha is delivered by pump 64 at a rate of about 239,432 pounds per hour through line 38 to heat exchanger 37 in which it is chilled to 20° F. by indirect heat exchange with cold rich naphtha absorbent flowing in lines 36 and 41. From exchanger 37 the lean naphtha stream passes to exchanger 66 in which it is cooled to —10° F. by indirect heat exchange with liqiud ammonia vaporizing at 2 p.s.i.g. and —23° F. Liquid ammonia is introduced into exchanger 66 through line 182 and the vaporous ammonia is withdrawn through line 186. Approximately 177,347 pounds per hour of the —10° F. lean naphtha is passed in conduit 31 from exchanger 66 to a point near the top of the upper absorption zone 28 of naphtha absorption column 26. The balance of the —10° F. lean naphtha is further cooled in heat exchanger 67 to —40° F. by indirect heat exchange with a cold tail gas which is introduced into exchanger 67 through line 121 at —55° F. and is withdrawn from exchanger 67 through line 122 at —32° F. The —40° F. lean naphtha then passes in line 32 at a rate of about 62,085 pounds per hour to the top of upper absorption zone 28 of naphtha absorption column 26. It should be understood that all of the lean naphtha recirculating to the upper absorption zone 28 from the third stripping zone 48 through lines 63 and 38 can be introduced at a single point and at the higher temperature to absorption zone 28. The purpose of further chilling a portion of the recirculating lean naphtha stream is to reduce the temperature of the purified gas withdrawn through line 34 from the uper absorption zone 28 consistent with the subsequent treatment of the purified gas in a low temperature process for the selective absorption of acetylene. Since the upflowing gas in absorption zone 28 contains some water vapor and vaporized absorbent, cooling to —36° F. in the top portion thereof causes substantially all of these materials to be condensed. An ammonia-water phase is permitted to separate in the lower portion of absorption zone 28 and is withdrawn therefrom through line 30. Cooling in the absorption zone rather than in an external heat exchanger avoids pumping small amounts of cold condensed absorbent and ammonia-water back into the system.

The recirculating naphtha stream in line 38 contains small amounts of water picked up in the second absorption zone by virtue of the cooling and condensing there done. To prevent the freezing of this water and of that in the second absorption zone, about 20 pounds per hour of ammonia are injected through line 65 into the relatively large recirculating lean naphtha stream in line 38 upstream from exchanger 37 and about 4 pounds per hour of ammonia are injected through line 70 into the portion of the relatively large recirculating lean naphtha stream cooled to —40° F. in exchanger 67 and thereafter flowing in line 32, upstream from exchanger 67. The relatively small recirculating lean naphtha stream in line 59 is normally water-free so that ammonia antifreeze need not be injected. However, under some circumstances, such as start-up, some water is present and provision is made to inject ammonia into line 59 through line 60 upstream from exchanger 53.

In each of the foregoing circulating systems, a virgin naphtha is used having a boiling range of 311° F. to 435° F. (ASTM distillation), a specific gravity of 48.0° API and a Watson K factor of 11.95.

Various modifications and alterations of the process of this invention will be apparent to those skilled in the art and may be used without departing from the scope of the invention.

We claim:
1. In a process for separating $C_3$ and heavier hydrocarbons including $C_6$ hydrocarbons from a gas mixture containing the same and acetylene comprising contacting said gas mixture in a first absorption zone with a first heavy naphtha stream under suitable conditions to absorb substantially all of said $C_6$ hydrocarbons from said gas mixture, contacting the resultant gas mixture from the first absorption zone with a second heavy naphtha stream providing a molar ratio of heavy naphtha to gas between about 8 and about 30 times a great as that provided by said first heavy naphtha stream in said first absorption zone in a second absorption zone maintained under suitable conditions to absorb substantially all of said $C_3$ hydrocarbons from said resultant gas mixture, contacting bottoms from said first absorption zone with a stripping gas in a first stripping zone under conditions suitable to remove hydrocarbons absorbed in said first absorption zone, contacting bottoms from said second absorption zone with a stripping gas in a second stripping zone under conditions suitable to remove hydrocarbons absorbed in said second absorption zone, and recycling at least a portion of the bottoms from each of said first and second stripping zones, respectively, to said first and second absorption zones, the improvement which comprises passing at least a portion of the overhead fraction from the second stripping zone to the first stripping zone to provide at least a portion of said stripping gas supplied to said first stripping zone.

2. The improved method of claim 1 in which said first stripping zone is maintained at a lower temperature than that of said second stripping zone.

3. In a process for separating $C_3$ and heavier hydrocarbons including $C_6$ hydrocarbons from a gas mixture containing the same and acetylene comprising contacting said gas mixture in a first absorption zone with a first heavy naphtha stream under suitable conditions to absorb substantially all of said $C_6$ hydrocarbons from said gas mixture, contacting the resultant gas mixture from the first absorption zone with a second heavy naphtha stream providing a molar ratio of heavy naphtha to gas between about 8 and about 30 times as great as that provided by said first heavy naphtha stream in said first absorption zone in a second absorption zone under suitable conditions to absorb substantially all of said $C_3$ hydrocarbons and a minor amount of acetylene from said resultant gas mixture, contacting bottoms from said second absorption zone with a stripping gas in a first stripping zone under conditions suitable to remove absorbed acetylene, contacting bottoms from said first absorption zone with a stripping gas in a second stripping zone under conditions suitable to remove hydrocarbons absorbed in said first absorption zone, contacting bottoms from said first stripping zone with a stripping gas in a third stripping zone under conditions suitable to remove remaining hydrocarbons absorbed in said second absorption zone, and recycling at least a portion of the bottoms from each of said second and third stripping zones, respectively, to said first and second absorption zones, the improvement which comprises passing at least a portion of the overhead fraction from the third stripping zone to the second stripping zone to provide at least a portion of said stripping gas supplied to said second stripping zone.

4. The improved method of claim 3 in which said second stripping zone is maintained at a lower temperature than that of said third stripping zone.

References Cited by the Examiner

UNITED STATES PATENTS

| | | | |
|---|---|---|---|
| 2,714,940 | 8/55 | Milligan | 260—679 |
| 2,714,332 | 4/56 | Finneran et al. | 260—679 |
| 2,805,733 | 9/57 | Stanton | 260—677 |
| 3,023,843 | 3/62 | Grubb et al. | 260—679 X |

ALPHONSO D. SULLIVAN, *Primary Examiner.*

UNITED STATES PATENT OFFICE
CERTIFICATE OF CORRECTION

Patent No. 3,201,920                                                 August 24, 1965

George Craig Grubb et al.

It is hereby certified that error appears in the above numbered patent requiring correction and that the said Letters Patent should read as corrected below.

Column 4, lines 27 and 28, for "strippine" read -- stripping --; line 73, after "stage" insert a period; column 7, line 34, for "in" read -- to --; column 9, line 4, strike out "stripping zone 54"; line 39, for "striping" read -- stripping --; column 10, line 19, for "uper" read -- upper --; line 68, for "a" read -- as --; column 12, line 25, for "2,714,332" read -- 2,741,332 --.

Signed and sealed this 22nd day of February 1966.

(SEAL)
Attest:

ERNEST W. SWIDER                                         EDWARD J. BRENNER
Attesting Officer                                            Commissioner of Patents